Nov. 6, 1951  M. L. MENNESSON  2,574,342
PNEUMATIC BORE GAUGE
Filed Sept. 28, 1945
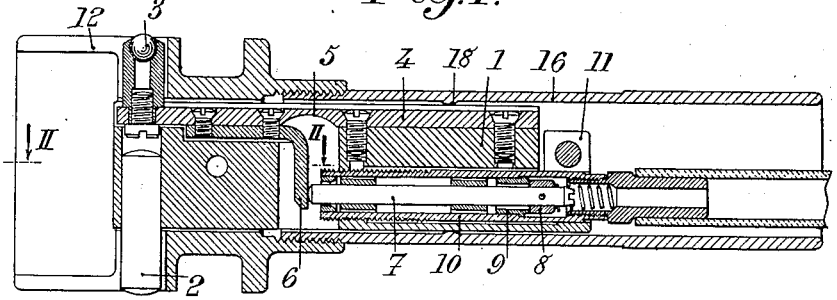
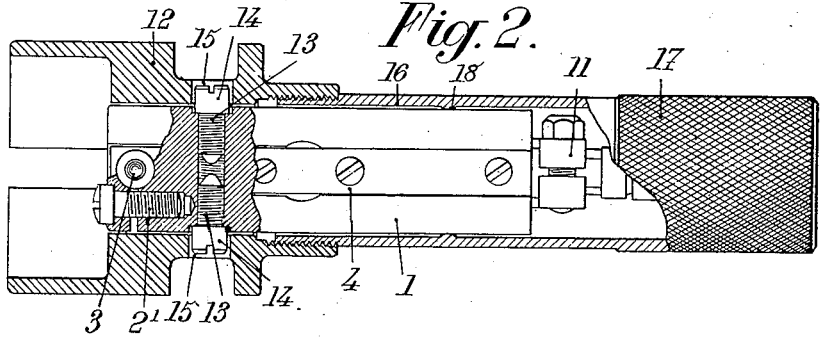
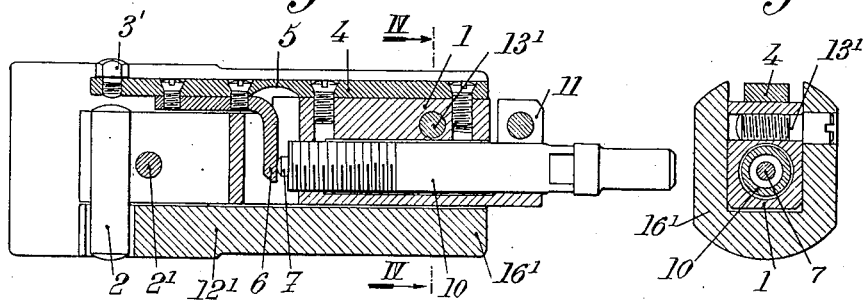 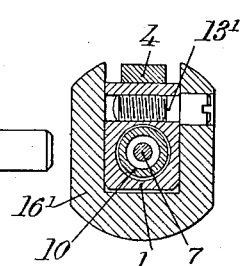
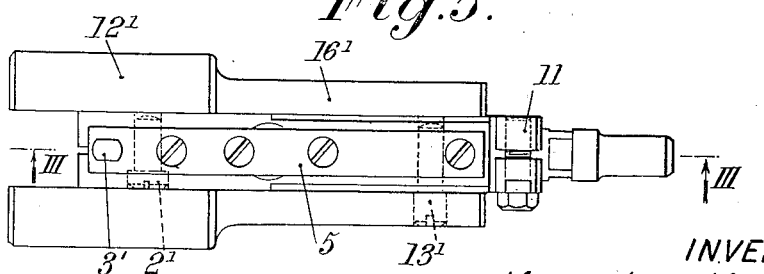
INVENTOR
MARCEL LOUIS MENNESSON
BY Henry J. Lucke
ATTORNEY Patented Nov. 6, 1951

2,574,342

UNITED STATES PATENT OFFICE 2,574,342

PNEUMATIC BORE GAUGE

Marcel Louis Mennesson, Neuilly-sur-Seine, France, assignor to Societe Anonyme de Construction de Materiel Automobile (S. A. C. M. A.), Neuilly-sur-Seine (Seine), France Application September 28, 1945, Serial No. 619,098
In France December 28, 1944

7 Claims. (Cl. 33—178)

The present invention relates to apparatus for measuring or checking, through pneumatic micrometry, the distance between two walls or the inner diameter of a hole or bore, such apparatus being generally called "calipers" and being of the kind described in the French patent application Ser. No. 490,235, of April 22, 1944, filed by the Société Anonyme de Construction de Materiel Automobile, now Patent No. 247,742, issued December 16, 1947.

Precision of the measurement obtained by means of such instruments is influenced by certain factors which depend upon the operator himself, since the apparatus is to be brought into suitable position for performing the measurement, which compels the operator to try to obtain the position for which the common axis of the contact pieces is in a plane perpendicular to the walls the distance between which is to be measured or is disposed along a diameter of the hole or bore. If this condition is not complied with the measurement that is obtained is not quite accurate.

It is known to provide a measurement gauge with a guiding part, generally constituted by a cylindrical or conical extension, integral with said gauge and the dimension of which is slightly smaller than that of said gauge.

But, up to the present time, no such guiding means had ever been provided in connection with pneumatic amplification measurement apparatus of the calipers kind.

The object of the present invention is to provide a measurement apparatus of this kind which automatically occupies a correct position in the space to be measured, so as to eliminate the influence of the factors, depending upon the operator, which might be detrimental to the precision of the measurement.

Other objects of my invention will be apparent from the following detailed description of some specific embodiments thereof with reference to the accompanying drawings, given merely by way of example, and in which:

Fig. 1 is a longitudinal sectional view of a measurement apparatus of the calipers kind made according to a first embodiment of my invention;

Fig. 2 is a corresponding plan view, with portions shown in horizontal section on the line II—II of Fig. 1;

Fig. 3 is a longitudinal sectional view, on the line III—III of Fig. 5, of a second embodiment of my invention;

Fig. 4 is a cross section on the line IV—IV of Fig. 3; and

Fig. 5 is a plan view corresponding to Figs. 3 and 4.

Concerning the measurement apparatus proper, it is made in any suitable manner, for instance as described in the above cited prior patent application. It includes a body 1 carrying a fixed contact piece 2 of cylindrical shape, kept in position by screws $2^1$, and a movable contact piece 3, for instance (Fig. 1) a ball. Both of these contact pieces are rounded with sufficiently small radius of curvature to make sure that they are in punctual contact, i. e. in contact limited to a point with the wall of the piece to be measured. Ball 3 is supported by an arm 4 fixed to body 1 and a portion 5 of which is of reduced thickness so as to facilitate displacement of movable contact piece 3 with respect to body 1 by bending deformation of arm 4. Ball 3 is so positioned that, in its position of rest, its center is located on the axis of contact piece 2 and remains substantially thereon during the very small relative displacements that may take place between pieces 2 and 3.

The transverse displacement of movable contact piece 3 with respect to body 1 is transmitted, through lever 6, bent at right angles, to the end of the stem 7 of a valve 8. This valve 8 cooperates with a seat 9 provided in a circuit through which a gas at uniform pressure is caused to circulate. Thus, by measuring the pressure drop across valve 8—9, the distance between contact pieces 2 and 3 is measured with the desired pneumatic amplification.

Valve 8 and its seat 9 are housed in a tubular piece 10 screwed in body 1 and held in position through any suitable means, as shown at 11.

Now, according to the present invention, the contact pieces 2 and 3 are housed in a guiding element 12, of cylindrical shape and the transverse section outline of which is of the same shape as the space to be measured.

In the example shown by Figs. 1 and 2, the space in question is a cylindrical bore, so that the external wall of guide member 12 is of cylindrical shape.

A handle 16, also of cylindrical shape, is mounted rigid with guide member 12 coaxially therewith. This handle surrounds the portion of body 1 which is not located inside guide member 12 and which contains pneumatic micrometry means 7—8—9—10. The end 17 of this handle is milled so that it can be held without risk of slipping.

The external dimension of guide member 12 is chosen slightly smaller than the corresponding dimension to be measured so that the free ends of contact members 2 and 3 project slightly from the external surface of the guide member and are able to come into contact with the inner wall of the bore without the external face of the guide member being in contact with said wall.

Body 1 and guide member 12 are assembled together by means of two studs or fingers 13, fixed in body 1, for instance by screwing, and the heads 14 of which are respectively engaged in holes 15 provided in the wall of the guide member close to the place where measurement takes place, and which serve to prevent the body from escaping from the guide member.

However, the play provided between each screw head 14 and the corresponding hole 15 is given a value sufficient for permitting a relatively important displacement (some tenths of a millimeter) of body 1 with respect to guide member 12.

Furthermore, the inner diameter of guide member 12 is given a value sufficient for permitting of inserting body 1 into the guide member with a certain play, also of some tenths of a millimeter, so as to permit such relative displacements.

When the apparatus is in position in the piece to be measured, contact parts 2 and 3 project from the external surface of the guide member, to a distance of one or two tenths of a millimeter. As the differences of dimensions to be measured are generally of some hundredths, or even thousandths of a millimeter, fingers 13 cannot in any way interfere with the longitudinal and/or angular displacements of the apparatus proper inside the guide member, since the plays provided about these fingers are greater than the maximum possible play of the guide member in the piece to be measured.

Instead of leaving a uniform cylindrical play between guide member 12 and body 1, I may, according to my invention, provide between them a kind of swivel joint, constituted for instance by a tore-shaped rib 18 provided either on the outer face of body 1 or, rather, as shown, on the inner wall of handle 16. This joint is located rather far from the contact pieces 2 and 3 and permits an angular displacement of the measurement apparatus proper with respect to its guide member, fingers 13 limiting its longitudinal displacement.

In the embodiment illustrated by Figs. 3, 4 and 5, body 1 and the parts it carries are made as above described, with the exception of the second contact member, 3', which is constituted by the head of a screw mounted on arm 4. In this construction, guide member $12^1$ and handle $16^1$ are given, in cross section, the shape of a U between the branches of which the amplifying apparatus is housed, so that this apparatus is accessible from above and can be easily introduced into the guide member or removed therefrom.

The apparatus proper and the guide member are assembled together through a single finger or pin $13^1$, located at a relatively great distance from the place where the measurement is to be performed. This pin $13^1$ thus forms an axis about which body 1 is pivoted to the handle $16^1$ of guide member $12^1$. Owing to the U-shape of the guide member, its end close to contact parts 2 and 3' forms a slot in which said parts 2 and 3' are housed.

In this embodiment, the mounting of the body 1 of the amplification apparatus in guide member $12^1$ is effected without any material play either laterally or longitudinally. Only a small rotation about the axis of pin $13^1$ permits a small angular displacement of contact elements 2 and 3' with respect to the guide member proper, for enabling these elements automatically to come into contact with the walls of the bore to be measured.

The guide member is provided with a handle shorter than in the embodiment of Fig. 1, so as to leave within reach the valve body locking means 11.

As a matter of fact, the preliminary adjustment of the apparatus in a gauge ring or by means of a standard piece is effected by screwing or unscrewing tube 10, which surrounds valve 8, in the body of the amplifying apparatus. Once this adjustment has been performed, tube 10 is secured in position through locking means 11. Therefore, the locking system should be within reach of the operator's hand.

It suffices to introduce the whole of the guide member and the amplification apparatus into a bore or the like for obtaining an automatic positioning of the amplification apparatus in said bore, that is to say a position such that the common axis of elements 2 and 3' is located in a diametrical plane of the bore to be measured and, therefore, is perpendicular to the axis of said bore. The face that these two conditions are complied with therefore eliminates any mistake due to an incorrect utilization of the apparatus by the operator, and permits of obtaining a very accurate measurement with the minimum of precautions. It is no longer necessary to employ highly trained operators for utilizing this apparatus.

Of course, it is not necessary to have cylindrical bores or holes to measure or check for making use of an apparatus according to the invention. It suffices, in the case of holes of other shapes, to make use of a guide member of the same shape, in cross section, as the hole to be measured, but of slightly smaller dimensions.

It will be readily understood that the apparatus above described is also well adapted for use in order to measure the distance between two parallel or other walls.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. For measurement of the distance between two opposed points of a piece, an apparatus which comprises, in combination, a body, two measuring punctual contact elements carried by said body, each for cooperation with one of said points respectively, at least one of said contact elements being elastically mounted on said body for movement toward and away from the other contact element, pneumatic micrometry means carried by said body operative in response to relative displacements of said contact elements with respect to each other, a guide member adapted to engage said piece with a slight play a handle rigid with said guide member, at least partly surrounding with play at least the central portion of said body and a portion of said pneumatic micrometry means and limited amplitude lost motion interconnecting means between said body and said guide member for holding said body loosely secured to said guide member.

2. For measurement of the distance between two opposed points of a piece, an apparatus which comprises, in combination, a body, two measuring punctual contact elements carried by said body, each for cooperation with one of said points respectively, at least one of said contact elements being elastically mounted on said body for movement toward and away from the other contact element, pneumatic micrometry means carried by said body operative in response to relative displacements of said contact elements with respect to each other, a guide member adapted to engage said piece with a slight play a handle rigid with said guide member at least partly surrounding with play at least the central portion of said body and a portion of said pneumatic micrometry means, and a limited amplitude longitudinally slidable universal joint connection between said body and the whole of said guide member and said handle for holding said body loosely secured to said guide member.

3. An apparatus according to claim 2, in which said guide member partly surrounds said body.

4. For measurement of the inner diameter of a bore in a piece, an apparatus which comprises, in combination, a body of elongated shape, two measuring punctual contact elements carried by said body near one end thereof and projecting on either side thereof respectively, at least one of said contact elements being elastically mounted on said body for movement with respect to the other contact element in a direction at right angles to the longitudinal dimension of said body and the distance between the outermost points of said contact elements in the state of rest being slightly greater than the theoretical inner diameter of said bore, pneumatic micrometry means carried by said body operative in response to relative displacements of said contact elements with respect to each other, a guide member surrounding said end of said body, at least a portion of the outer wall of said guide member being cylindrical and of a diameter slightly smaller than the theoretical diameter of said bore so that said guide member can engage in said bore with a slight play, a handle rigid with said guide member at least partly surrounding with play at least the central portion of said body and a portion of said pneumatic micrometry means, and limited amplitude lost motion interconnecting means between said body and said guide member for holding said body loosely secured in said guide member.

5. An apparatus according to claim 2, the universal joint connection including a tore shaped rounded projection carried by the inner wall of said handle and an annular surface on the outer wall of said body in tangential contact with said projection at a substantial distance from said contact elements.

6. An apparatus according to claim 2, the universal joint connection including a tore shaped rounded projection carried by the inner wall of said handle and an annular surface on the outer wall of said body in tangential contact with said projection at a substantial distance from said contact elements, further including transverse pins fixed to said body and extending on opposite sides thereof, said guide member being provided with longitudinally elongated holes for accommodating said pins with a slight play.

7. An apparatus according to claim 4 including a pivot pin rigid with said handle extending therein transversely therethrough, said body being provided with a hole forming a bearing for said pin.

MARCEL LOUIS MENNESSON.

REFERENCES CITED

The following references are of record in the file of this patent:

UNITED STATES PATENTS

| Number | Name | Date |
|---|---|---|
| 1,972,124 | Aldeborgh et al. | Sept. 4, 1934 |
| 2,024,021 | Aldeborgh et al. | Dec. 10, 1935 |
| 2,199,052 | Lee | Apr. 30, 1940 |
| 2,298,898 | Oswin | Oct. 13, 1942 |
| 2,306,469 | Rupley | Dec. 29, 1942 |
| 2,358,769 | Aller | Sept. 19, 1944 |
| 2,369,319 | Smith | Feb. 13, 1945 |
| 2,370,219 | Aller | Feb. 27, 1945 |
| 2,381,491 | Emmerton | Aug. 7, 1945 |

FOREIGN PATENTS

| Number | Country | Date |
|---|---|---|
| 601,908 | Great Britain | May 14, 1948 |
| 606,434 | Great Britain | Aug. 13, 1948 |